(12) United States Patent
Ventola et al.

(10) Patent No.: US 8,320,541 B2
(45) Date of Patent: Nov. 27, 2012

(54) TRANSFER OF CALL INFORMATION

(75) Inventors: Ville Ventola, Lapua (FI); Timothy Strudwick, Cairo (EG)

(73) Assignee: Mobiconverge Oy, Lapua (FI)

( * ) Notice: Subject to any disclaimer, the term of this patent is extended or adjusted under 35 U.S.C. 154(b) by 644 days.

(21) Appl. No.: 12/556,815

(22) Filed: Sep. 10, 2009

(65) Prior Publication Data

US 2010/0093321 A1    Apr. 15, 2010

(30) Foreign Application Priority Data

Sep. 10, 2008  (FI) ..................................... 20085849

(51) Int. Cl.
*H04M 15/06* (2006.01)
(52) U.S. Cl. ................... 379/142.06; 455/415; 455/466; 379/142.04
(58) Field of Classification Search ............ 379/142.01, 379/142.04, 142.06, 142.08, 201.01, 207.02, 379/207.15; 455/403, 414.1, 415, 466
See application file for complete search history.

(56) References Cited

U.S. PATENT DOCUMENTS

| | | | |
|---|---|---|---|
| 7,904,066 B2 * | 3/2011 | Seo | .............................. 455/415 |
| 2005/0249344 A1 * | 11/2005 | Mueller et al. | ........... 379/207.15 |
| 2007/0147597 A1 | 6/2007 | Bangor et al. | |
| 2010/0254520 A1 * | 10/2010 | Oren et al. | ................. 379/88.13 |

FOREIGN PATENT DOCUMENTS

| | | |
|---|---|---|
| EP | 1172993 A2 | 1/2002 |
| FI | 20030661 A | 3/2004 |
| WO | 9933287 A2 | 7/1999 |

OTHER PUBLICATIONS

Search Report, dated Jun. 23, 2009, in Finnish Priority Application No. 20085849.
Extended European Search Report, dated Dec. 22, 2009, in EP 09169445.
Finnish Office Action, Dated Jun. 24, 2009, in Application No. 20085849.

* cited by examiner

*Primary Examiner* — Chi Pham
*Assistant Examiner* — Weibin Huang
(74) *Attorney, Agent, or Firm* — Young & Thompson (57) ABSTRACT

A method for transferring call information, includes the steps of a) receiving a server message (20) transmitted to a server (10) via an information network (3) in connection with a mobile telephone network voice call (2), the server message comprising at least one parameter (ID) related to a mobile terminal (4) in connection with the server via the information network and/or a mobile station user (5), a telephone number (SNUM) of a second party of the voice call, and b) producing, on the basis of the received server message (20), dedicated call data (30) retrievable by the information network (3). A server (10) implementing the method is also described.

8 Claims, 6 Drawing Sheets

TRANSFER OF CALL INFORMATION

BACKGROUND OF THE INVENTION

The invention relates to mobile terminals and particularly to transfer of a second party's telephone number in voice calls of mobile terminals.

The user of a mobile terminal, such as a mobile phone, often needs to know something else about the caller than his/her telephone number transmitted in connection with a mobile call. This is particularly important in the field of customer service, for instance in CRM (Customer Relationship Management) applications.

At present, the user of a mobile phone may obtain information on the caller to his/her mobile phone in an SMS (Short Message Service) message.

Call information of mobile phones cannot at present be utilized effectively in computer systems.

BRIEF DESCRIPTION OF THE INVENTION

It is an object of the invention to provide a method and equipment implementing the method in such a manner that above problems can be solved. The object of the invention is achieved by a method and equipment, which are characterized by what is stated in the independent claims. The preferred embodiments of the invention are disclosed in the dependent claims.

The invention is based on utilizing a data connection of a mobile terminal during a voice call for presenting customer information or activating the voice call.

An object of the present invention is to provide a method for transferring call information.

Another object of the present invention is to provide equipment for transferring call information.

The method to be implemented in a server comprises the steps of:
a) receiving a server message transmitted to the server via an information network in connection with a mobile telephone network voice call, the server message comprising:
at least one parameter related to a mobile terminal in connection with the server via the information network and/or a mobile station user,
a telephone number of a second party of the voice call,
b) producing, on the basis of the received server message, dedicated call data retrievable via the information network.

An embodiment of the present invention provides transfer of caller information to be displayed on a screen of a terminal, such as a computer. A customer calls the mobile terminal user, who is working as a customer service person or a seller in a firm, for instance. The mobile telephone network transmits the call via a base station and sends the caller's number along with the voice call.

When the customer calls the mobile terminal user, such as a person working in a firm's customer service or sales, the information on the calling customer appears on the user's terminal almost simultaneously. The customer information can be presented, for example, by an application, such as a browser, of the terminal connected to the information network. When the call arrives at the mobile terminal, a program installed in the mobile terminal transmits a communication protocol, such as http, https, ftp or the like, through the Internet by utilizing authentication parameters, such as the caller's telephone number and user names, to the web server, where the information is stored in a database.

The application on the terminal checks via http, https or some other connection by using the user name and the password, whether a call has arrived at the mobile terminal of the customer service person or salesperson, and if that is the case, the application on the computer opens the browser and calls the Internet address defined in the settings (e.g. the CRM application related to the customer), thereby using the telephone number of the calling customer and other necessary parameters, which may be defined in the settings of an interface application. This can also be implemented at present data transmission rates in a few seconds.

This makes the use of customer service systems more efficient, because information on the calling customer appears directly on the display without performing a separate search.

An embodiment of the present invention provides transmission of a call command from a computer to a mobile terminal. In this case, the server message of step a) is transmitted from a computer connected to an information network by means of a browser or a program to which the user of the computer has logged on, the server message including information in such a manner that the parameters related to the mobile terminal and/or mobile terminal user are parameters predefined in the server, and the telephone number SNUM of the second party of the mobile telephone network voice call is the telephone number of the voice call recipient.

The server may provide the retrievable call data with a call parameter, which is a parameter for activating a mobile telephone network voice call.

The server of the present invention comprises:
first connection means for receiving a server message transmitted to the server via an information network in connection with a mobile telephone network voice call, the server message comprising
at least one parameter related to a mobile terminal in connection with the server via the information network and/or a mobile terminal user, a telephone number (snum) of the second party of the voice call; and
second connection means for producing, on the basis of the received server message, dedicated call data retrievable via the information network.

The server also comprises database means for storing the server message. The database means may be implemented by not only conventional databases but also by data storage solutions of a structural description language, such as XML, executable over the information network. The database means may also be arranged to retrieve customer information attached to the telephone number (snum) of the second party of the voice call. The attached customer information may also be retrieved for display from the database of a third party. The server comprises second connection means arranged to produce the dedicated call data retrievable by a browser.

BRIEF DESCRIPTION OF THE FIGURES

The invention will now be described in greater detail in connection with preferred embodiments and with reference to the attached drawings, in which.

DETAILED DESCRIPTION OF THE INVENTION

Figure 1:
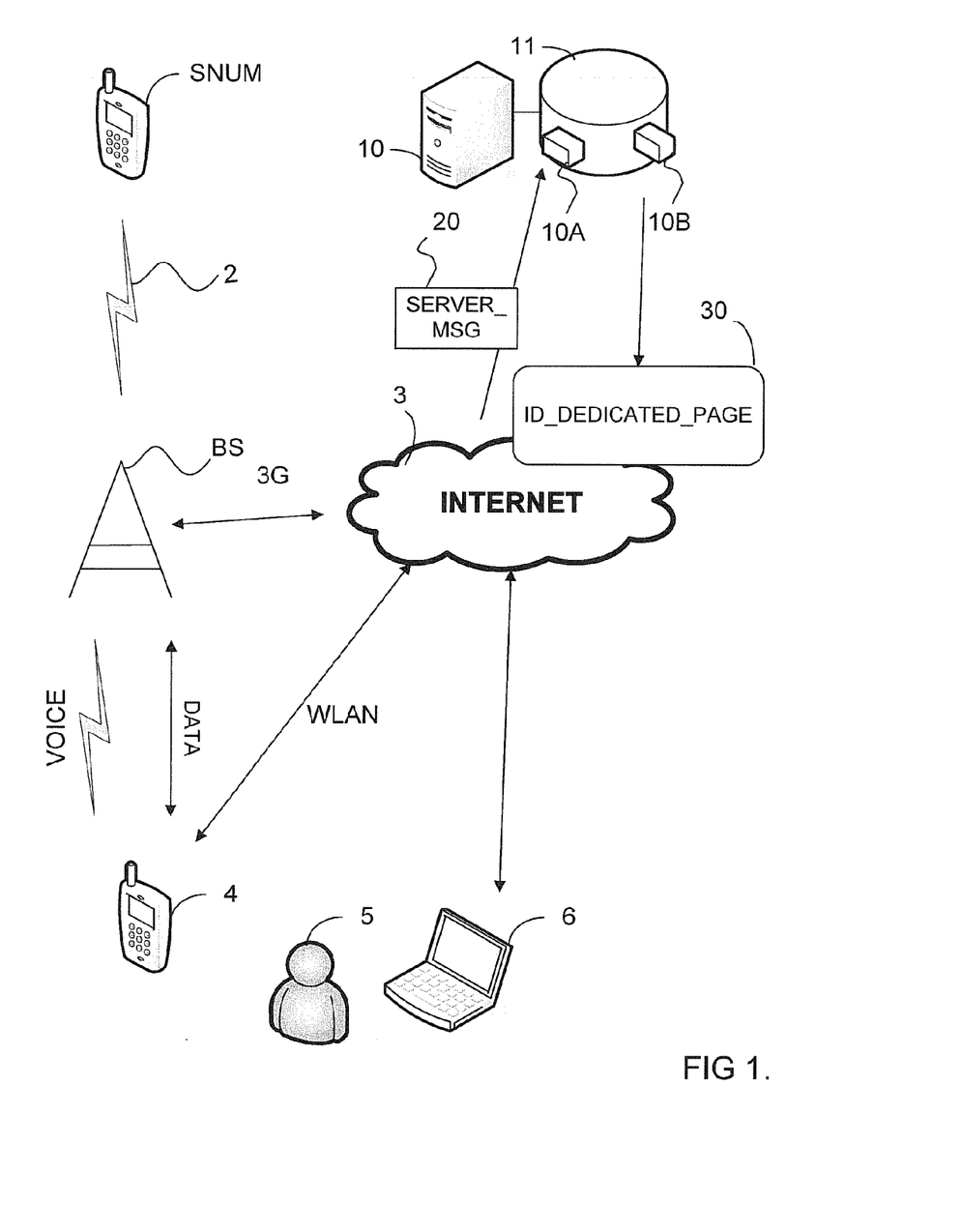
FIG. 1 shows the operational principle of the method according to the invention.

FIG. 1 shows the operational principle of a system implementing the present method. A server 10, such as a web server, receives the user-related parameters and a server message 20 containing the telephone number SNUM of the second party of the voice call by means of communication means 10A, such as via https, connected to an information network.

User-related parameters may include, for instance, a telephone number, user name and password. The parameters may be presented in the server message in a form of, for instance, a character string, from which the parameters can be distinguished to be input into different fields of the database entity. The contents of the server message are stored in a database 11. In addition to the received parameters, the server may add information, such as an ID number, processing data, time of arrival and call parameter, to the fields.

On the basis of the received server message 20, the server 10 produces dedicated call data 30 retrievable via an information network 3. The dedicated call data 30 may be, for example, a www page formed on the basis of the received parameters and retrievable via the information network 3 to be displayed on the screen of a mobile terminal 4 or a computer 6. An input in a correct form should in this case be entered to retrieve the www page. To form the input, in turn, parameters predefined in the mobile terminal or computer are utilized. In this way, it is possible to present dedicated call data 30 to a limited group.

Figure 2:
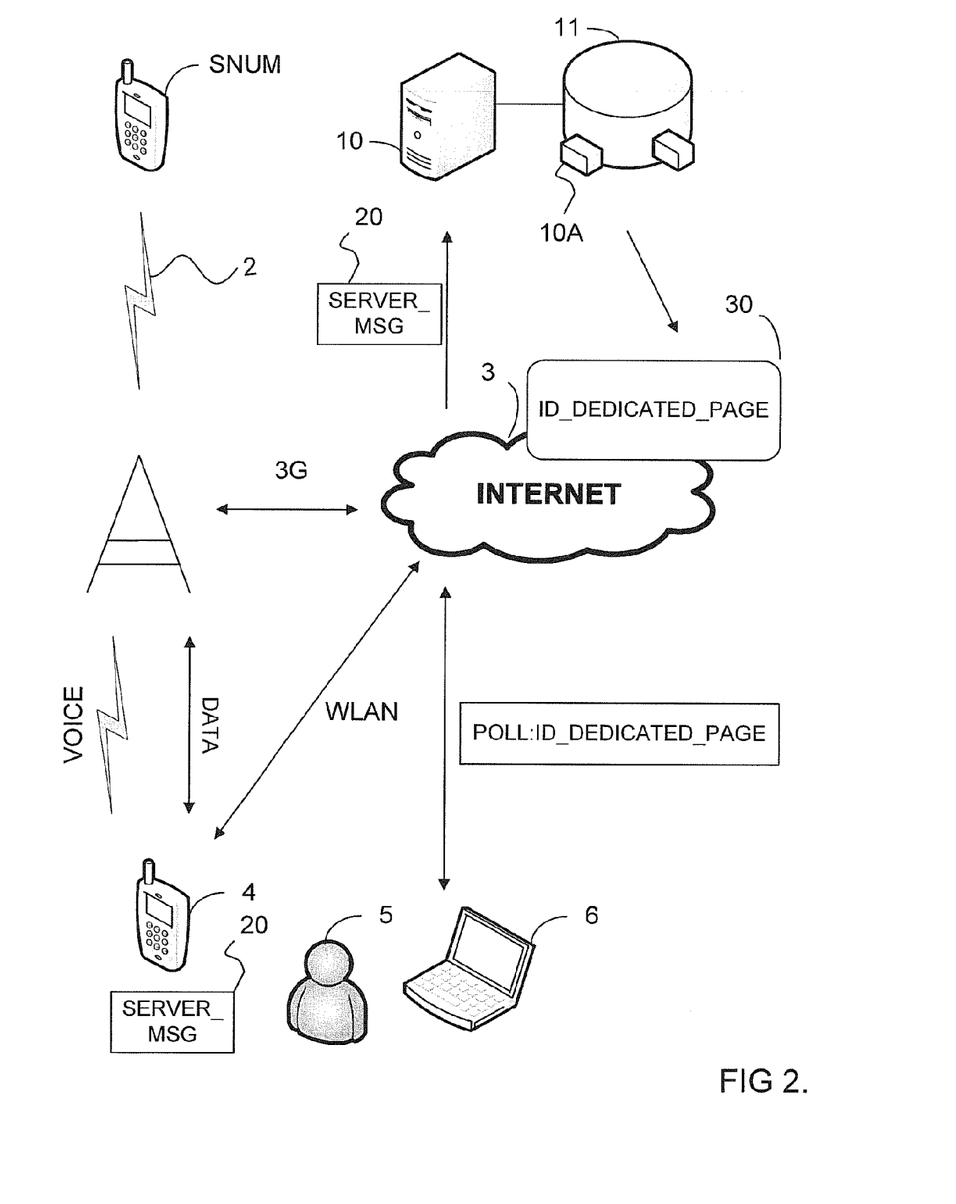
FIG. 2 shows an embodiment of the method according to the present invention, wherein a server message is received from a mobile terminal.

FIG. 2 shows an embodiment, in which the server message 20 is received from the mobile terminal 4 connected to the information network 3. The information network connection of the mobile terminal may be, for instance, 3G, WLAN or a similar connection.

The mobile terminal 4 should have software for server messages 20. The software of the mobile terminal may be interface software which operates between the voice call connection and data connection of the mobile terminal and identifies the received voice call, stores the telephone number SNUM of the second party of the voice call, forms a server message as a combination of the second party number and predefined parameters, and transmits the server message to the server by utilizing the data connection.

The software of the mobile terminal may be retrieved and installed by an address link. The predefined parameters of the server message may be input in connection with the installation. User-related parameters may include, for example, a telephone number, user name and password.

The server 10, such as a web server, receives the user-related parameters and the server message 20 containing the telephone number SNUM of the second party of the voice call by means of the communication means 10A, such as via https, connected to the information network.

The contents of the server message 20 are stored in the database 11. In addition to the received parameters, the server may add information, such as an ID number, processing data and time of arrival, to the fields.

On the basis of the received server message 20, the server 10 produces dedicated call data 30 retrievable via the information network 3. The dedicated call data 30 may be, for instance, a www page formed on the basis of the received parameters and retrievable via the information network 3 to be displayed on the computer 6 screen. Thus, in order to retrieve the www page, an input in a correct form should be entered. To form the input, parameters predefined in the computer 6 are utilized.

The computer browser checks at specific intervals, for instance at intervals of one second, whether dedicated call data are available for it. Alternatively, the user may update the page manually in a situation where he/she wants to see caller information. In this way, information on an incoming call is obtained onto the computer screen. It is to be noted that the computer may be any computer connected to the information network 3. The solution of the invention functions every time the base station transmits the information on the caller's telephone number SNUM.

Figure 3:
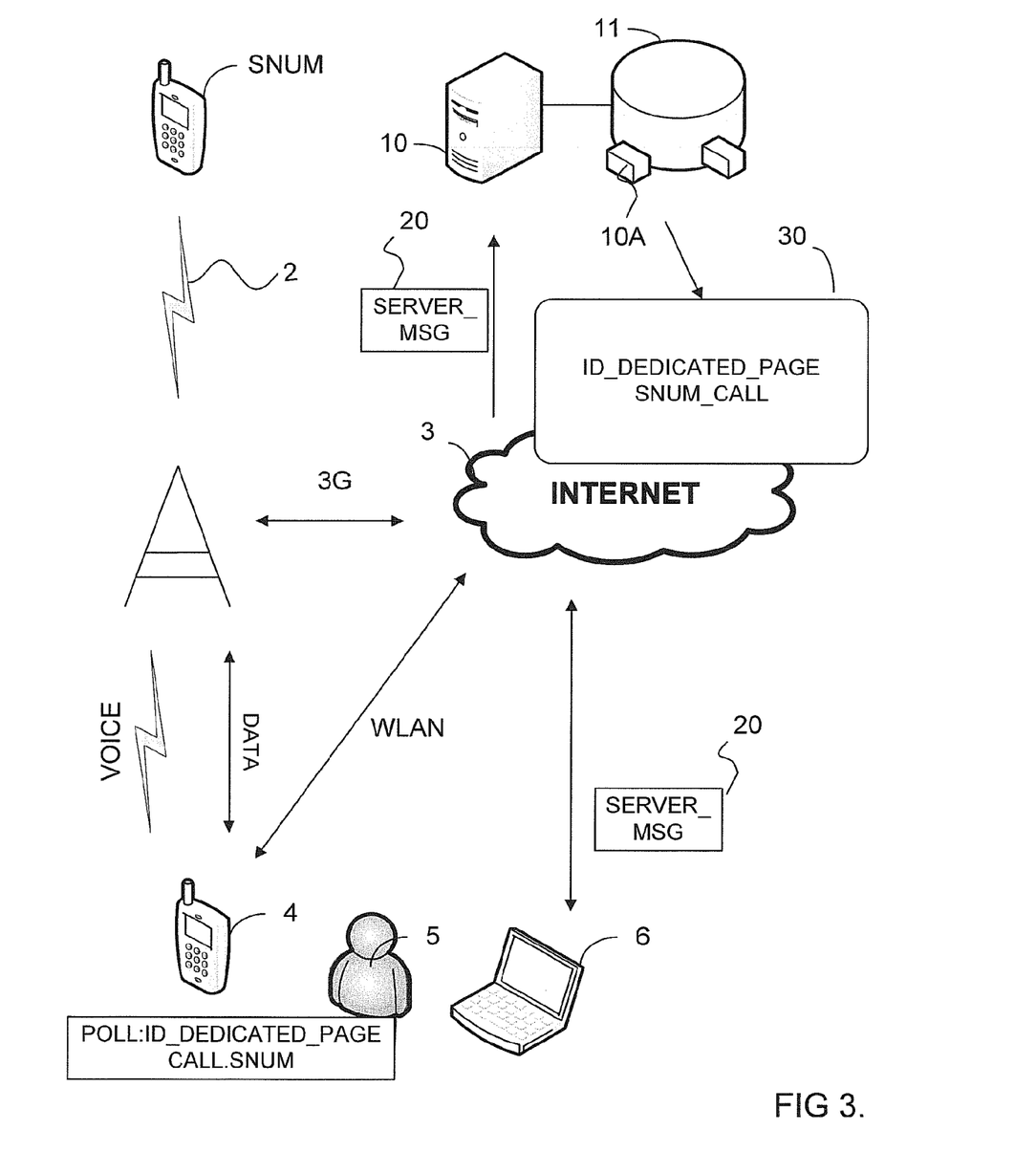
FIG. 3 shows an embodiment of the method according to the present invention, wherein a server message is received from a computer.

FIG. 3 shows an embodiment in which a server message is received from a computer. The server message 20 is transmitted from the computer 6 connected to the information network 3 by a browser or a program to which the user 5 of the computer has logged on, and information is included in the server message 20 as parameters.

The computer 6 should include software for server messages 20. The software on the computer may be software stored on a storage means or software used by, for instance, a browser via the information network.

The software of the computer 6 forms the server message 20 as a combination of the number SNUM of the second party and the predefined parameters, and transmits the server message 20 to the server 10 by utilizing the information network 3.

The predefined parameters of the server message may be input during installation or in connection with login. User-related parameters may include, for instance, a telephone number, user name and password.

The server 10, such as a web server, receives the user-related parameters and the server message 20 containing the telephone number SNUM of the second party of the voice call by means of the communication means 10A, such as via https, connected to the information network.

The contents of the server message 20 are stored in the database 11. In addition to the received parameters, the server may add information, such as an ID number, processing data and time of arrival, to the fields.

On the basis of the received server message 20, the server 10 produces dedicated call data 30 retrievable via the information network 3. The dedicated call data 30 may be, for instance, a www page formed on the basis of the received parameters and retrievable via the information network 3 to the mobile terminal 4. Thus, an input in a correct form should be entered in order to retrieve the www page. To form the input, parameters predefined in the mobile terminal 4 are utilized.

The server 10 may add a call parameter, which is a parameter for activating the mobile telephone network voice call 2, to the retrievable call data 30.

The software of the mobile terminal checks at specific intervals, for instance at intervals of one second, whether dedicated call data are available. The mobile terminal 4 should comprise software for server messages 20. The software of the mobile terminal may be interface software that operates between the voice call connection and data connection of the mobile terminal and identifies the call parameter, the number SNUM of the second party, from the server message and commands the calling unit to establish a voice call connection to the number SNUM of the second party.

In this way, a telephone connection can be activated by a computer. It is to be noted that the computer may be any computer connected to the information network 3.

Figure 4:
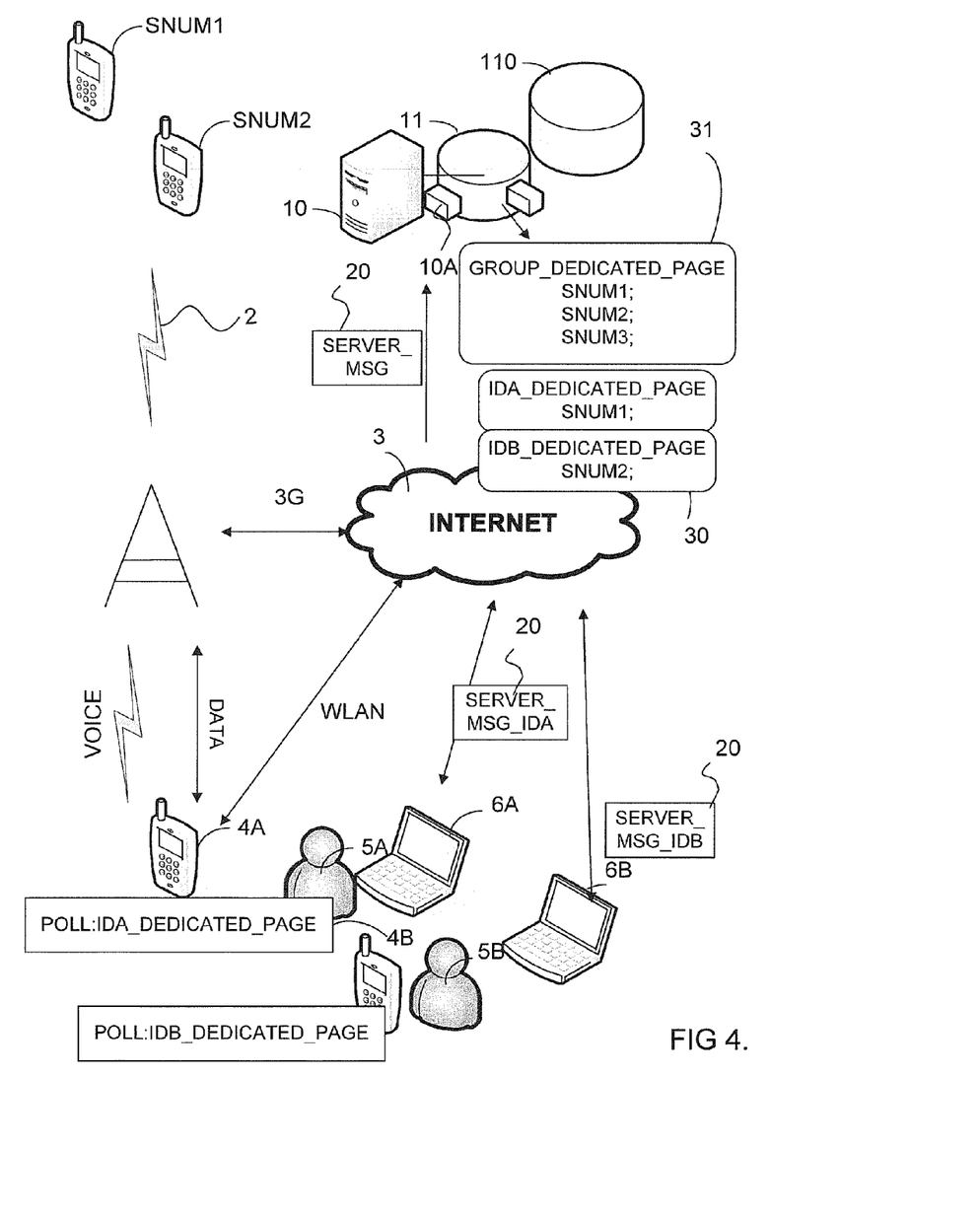
FIG. 4 shows an embodiment of the method according to the present invention, wherein several server messages are received from computers.

FIG. 4 shows an embodiment, in which a server message is received from a computer. The server message 20 is transmitted from the computers 6A, 6B connected to the information network 3 by a browser or from a program to which the users 5A, 5B of the computers have logged on, and information is included in the server message 20 as parameters.

The computers 6A, 6B should have software for server messages 20. The software on the computer may be software stored on a storage means, or it may be software that is used via the information network by means a browser, for instance.

The server 10 forms a contact list 31, which can be displayed for one or more users 5A, 5B of the group. To form the contact list, the database 11 of the server or the database 110 of a third party may be utilized. The contact list may also be a call list provided by a third party.

The software of the computer 6A forms the server message 20 as a combination of the second party number SNUM1 and the predefined parameters and transmits the server message 20 via the internet network 3 to the server 10.

The software of the computer 6B forms the server message 20 as a combination of the second party number SNUM2 and the predefined parameters and transmits the server message 20 via the internet network 3 to the server 10.

The predefined parameters of the server message may be input during installation or in connection with login. User-related parameters may include, for instance, a telephone number, user name and password.

The server 10, such as a web server, receives the user-related parameters and the server message 20 containing the telephone number SNUM of the second party of the voice call by means of the communication means 10A, such as via https, connected to the information network.

The contents of the server message 20 are stored in the database 11. In addition to the received parameters, the server may add information, such as an ID number, processing data and time of arrival, to the fields.

On the basis of the received server message 20, the server 10 produces dedicated call data 30 retrievable via the information network 3. The dedicated call data 30 may be, for instance, a www page formed on the basis of the received parameters and retrievable via the information network 3 to the mobile terminal 4. Thus, in order to retrieve the www page, an input in a correct form should be entered. To form the input, parameters predefined in the mobile terminal 4 are utilized.

The server 10 may add a call parameter, which is a parameter for activating the mobile telephone network voice call 2, to the retrievable call data 30.

The software of the mobile terminal 4A checks at specific intervals, for instance at intervals of one second, whether dedicated call data are available. In this case, it receives an instruction to call the number SNUM1.

The software of the mobile terminal 4B checks at specific intervals, for instance at intervals of one second, whether dedicated call data are available. In this case, it receives an instruction to call the number SNUM2.

The mobile terminals 4A, 4B should comprise software for server messages 20. The software of the mobile terminal checks at specific intervals, for instance at intervals of one second, whether dedicated call data are available. The mobile terminal 4 should comprise software for server messages 20. The software of the mobile terminal may be interface software that operates between the voice call connection and data connection of the mobile terminal and identifies the call parameter, the number SNUM of the second party, from the server message and commands the calling unit to establish a voice call connection to the number SNUM of the second party.

In this way, a telephone connection can be activated by a computer. It is to be noted that the computer may be any computer connected to the information network 3.

Figure 5:
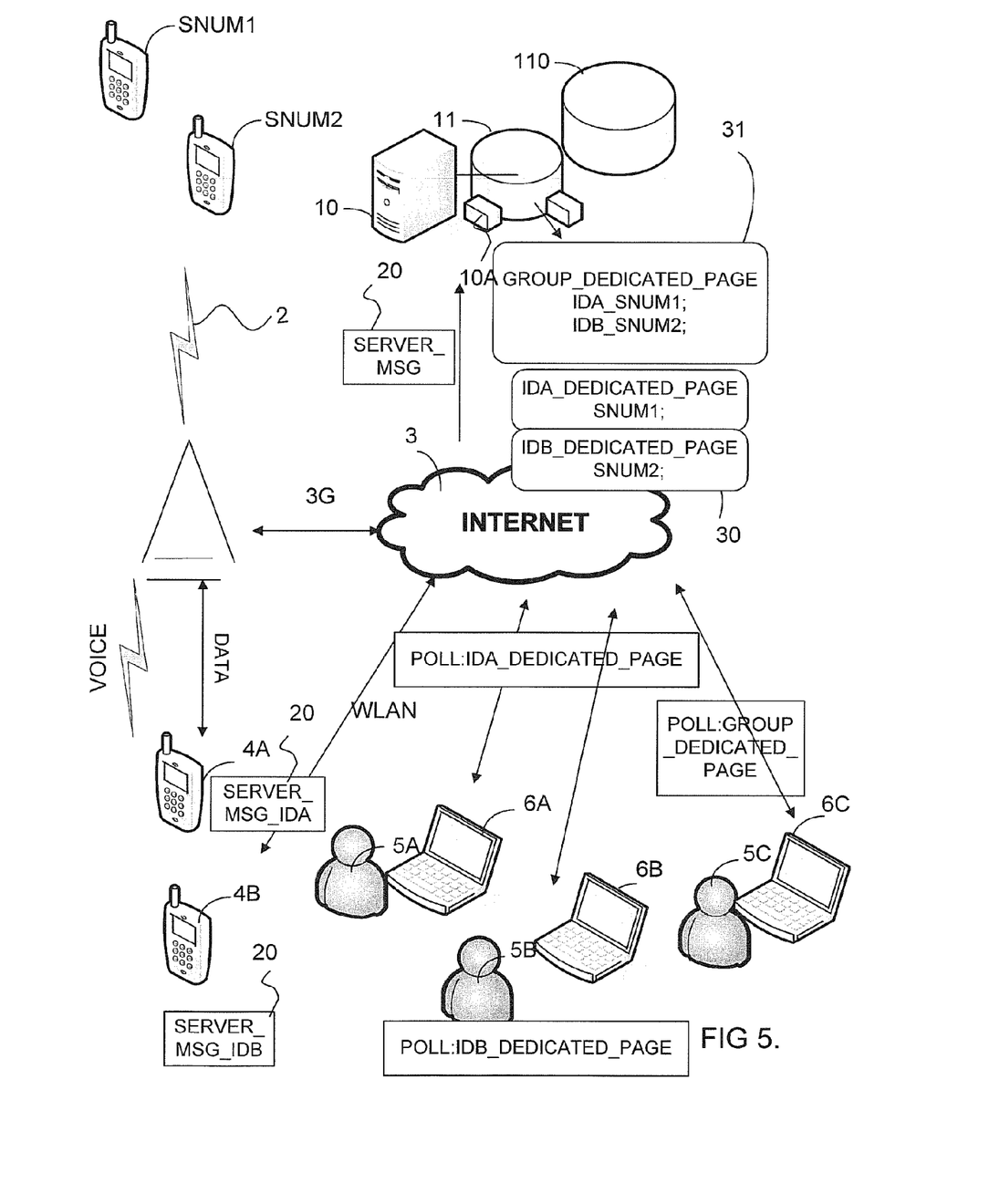
FIG. 5 shows an embodiment of the method according to the present invention, wherein server messages received from mobile terminals are transmitted in a group form.

FIG. 5 shows an embodiment, in which server messages are received from terminals 4A, 4B. The server 10 receives the user-related parameters and the server message 20 containing the telephone number SNUM of the second party of the voice call by means of the communication means 10A connected to the information network.

The contents of the server messages 20 are stored in the database 11. In addition to the received parameters, the server may add information, such as an ID number, processing data and time of arrival, to the fields.

The server 10 forms a contact list 31, which can be displayed for one or more users of the group; here it is displayed for the user 5C of the computer 6C. The user 5C can thus follow the calls that take place in the group. In this case, the user 5C obtains the information on the calls received at the mobile terminals of the users 5A and 5B.

An application of the computer 6A checks at specific intervals, for instance at intervals of one second, whether dedicated call data 30 are available. In this case, it obtains information that a call has arrived from the number SNUM1.

An application of the computer 6B checks at specific intervals, for instance at intervals of one second, whether dedicated call data 30 are available. In this case, it obtains information that a call has arrived from the number SNUM2.

The software of the mobile terminal 4A, 4B may be interface software that operates between the voice call connection and data connection of the mobile terminal and identifies the received voice call, stores the number SNUM of the second party of the voice call, forms the server message as a combination of the second party number and the predefined parameters, and transmits the server message to the server by using the data connection.

The software of the mobile terminal 4A, 4B may be interface software that operates between the voice call connection and data connection of the mobile terminal and identifies not only the reception of a voice call but also the ending of the voice call, in which case it transmits a second server message. The second server message 20 may be used for updating the contact list 31. In this manner it is possible to update the contact list 31 and the dedicated call data 30 to correspond to the real situation.

Figure 6:
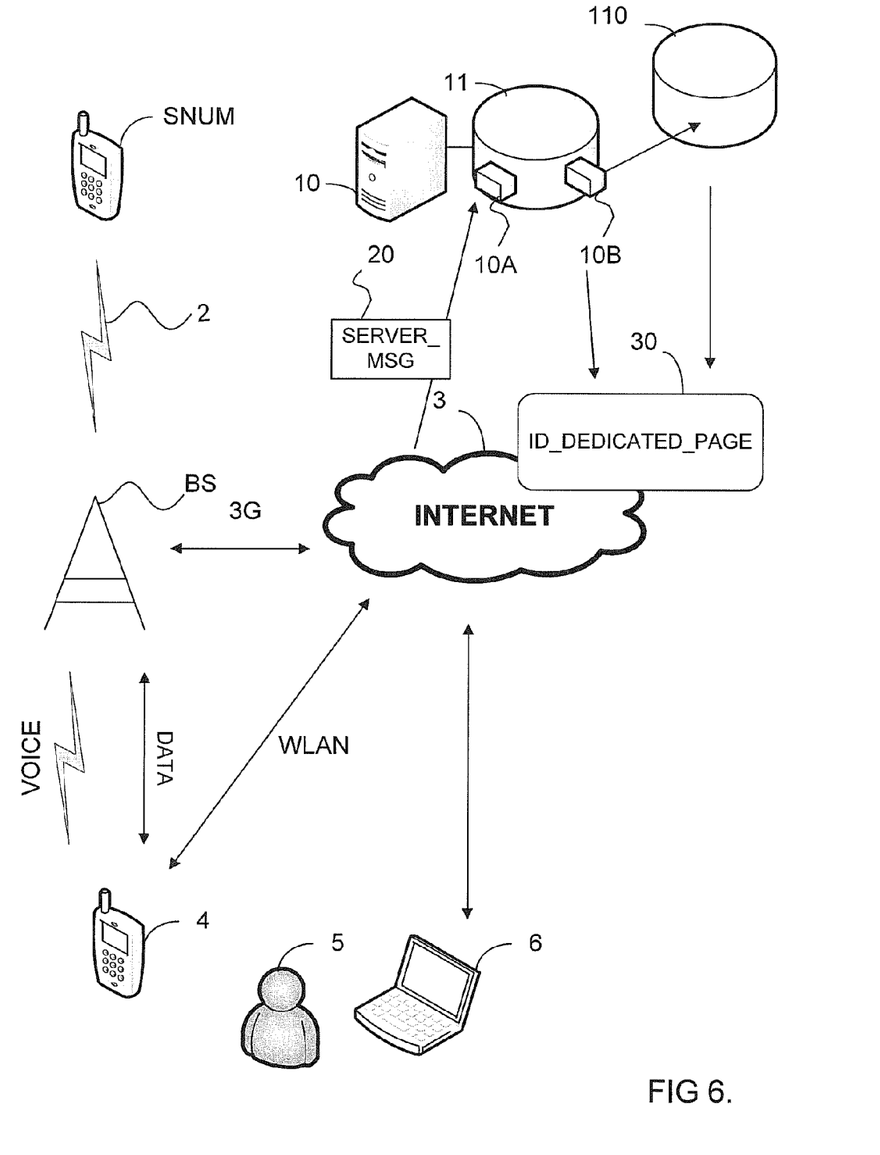
FIG. 6 shows an embodiment of the method according to the present invention, wherein dedicated call data may be provided by a third party.

FIG. 6 shows an embodiment, in which the dedicated call data may be provided by a third party or information of the third party may be added thereto.

Thus, the above embodiments are provided with a functionality, according to which additional information can be attached to the caller information SNUM or a customer file of separate software can be opened.

It is obvious to a person skilled in the art that, as technology advances, the basic idea of the invention may be implemented in a variety of ways. The invention and the embodiments thereof are thus not restricted to the above examples but may vary within the scope of the claims.

The invention claimed is:

1. A method for transferring call information, comprising:
   ia) displaying, for a predefined group, a plurality of telephone numbers of a second party of a voice call in a form of a list, a) transmitting a server message from a mobile terminal connected to an information network by means of an application to which a user of the terminal has logged on, and receiving the server message transmitted to a server via the information network in connection with a voice call, the server message comprising:
  at least one parameter related to the mobile terminal in connection with the server via the information network and/or the mobile terminal user, the server message including information in such a manner that the at least one parameter related to the mobile terminal and/or to the mobile terminal user is at least one parameter predefined in the server, and
  a telephone number of the second party of the mobile telephone network voice call selected from the list and added to the at least one parameter predefined in the server; and
b) producing, on the basis of the received server message, dedicated call data retrievable via the information network and containing the telephone number of the second party of the mobile telephone network voice call, selected from the list,
wherein the telephone number of the second party of the mobile telephone network voice call is the telephone number of the voice call recipient.

2. The method as claimed in claim 1, wherein the server message of step a) is received from the mobile terminal connected to the information network, and the mobile terminal has included the information in the server message in such a manner that the parameters related to the mobile terminal and/or mobile terminal user are parameters predefined in the mobile terminal, and
  the telephone number of the second party of the voice call is the telephone number of the caller of the incoming voice call.

3. The method as claimed in claim 2, wherein the server message of method step a) is received from the mobile terminal connected to the information network, and the method step
  b) produces, on the basis of the received server message, dedicated call data retrievable via the information network and presentable by a browser.

4. The method as claimed in claim 1, wherein the server provides the retrievable call data with a call parameter, which is a parameter for activating the voice call.

5. A server for transferring call information, comprising:
  first connection means for receiving a server message transmitted to the server from a mobile terminal connected to an information network by means of an application to which a user of the terminal has logged on, the server message transmitted via the information network in connection with a mobile telephone network voice call, the server message comprising
    at least one parameter related to the mobile terminal in connection with the server via the information network and/or the mobile terminal user, the server message including information in such a manner that the at least one parameter related to the mobile terminal and/or to the mobile terminal user is at least one parameter predefined in the server, and
    a telephone number of a second party of the mobile telephone network voice call selected from a plurality of telephone numbers of the second party of the voice call displayed, for a predefined group, in a form of a list, and added to the at least one parameter predefined in the server; and
  second connection means for producing, on the basis of the received server message, dedicated call data retrievable via the information network and containing the telephone number of the second party of the mobile telephone network voice call, selected from the list,
  wherein the telephone number of the second party of the mobile telephone network voice call is the telephone number of the voice call recipient.

6. The server as claimed in claim 5, wherein the server further comprises database means for storing the server message.

7. The server as claimed in claim 6, wherein the database means are arranged to add customer information attached to the telephone number of the second party of the voice call to the dedicated call data.

8. The server as claimed in claim 6, wherein the second connection means are arranged to produce the dedicated call data retrievable by a web browser.

* * * * *